(12) United States Patent
Most et al.

(10) Patent No.: US 11,565,486 B2
(45) Date of Patent: Jan. 31, 2023

(54) DEVICE AND METHOD FOR THE REPAIR OF LAMINATED AUTOGLASS

(71) Applicants: Rory R. Most, Durango, CO (US); Kerry A. Wanstrath, Durango, CO (US); Philip Charles Lauinger, IV, Durango, CO (US)

(72) Inventors: Rory R. Most, Durango, CO (US); Kerry A. Wanstrath, Durango, CO (US); Philip Charles Lauinger, IV, Durango, CO (US)

(73) Assignee: Glass Technology, Inc., Durango, CO (US)

( * ) Notice: Subject to any disclaimer, the term of this patent is extended or adjusted under 35 U.S.C. 154(b) by 291 days.

(21) Appl. No.: 16/738,690

(22) Filed: Jan. 9, 2020

(65) Prior Publication Data

US 2020/0223162 A1 Jul. 16, 2020

Related U.S. Application Data

(60) Provisional application No. 62/790,116, filed on Jan. 9, 2019, provisional application No. 62/792,275, filed on Jan. 14, 2019.

(51) Int. Cl.
*B29C 73/02* (2006.01)
*B29C 35/04* (2006.01)
(Continued)

(52) U.S. Cl.
CPC .......... *B29C 73/025* (2013.01); *B29C 35/041* (2013.01); *B29C 35/0805* (2013.01);
(Continued)

(58) Field of Classification Search
CPC ..... B29C 73/025; B29C 73/24; B29C 35/041; B29C 35/0805; B29C 35/00;
(Continued)

(56) References Cited

U.S. PATENT DOCUMENTS

| 4,919,602 A | * | 4/1990 | Janszen | ............. | B32B 17/10963 425/13 |
| 5,626,261 A | * | 5/1997 | Wanstrath | ......... | B32B 17/10963 118/256 |

(Continued)

*Primary Examiner* — Philip C Tucker
*Assistant Examiner* — Brian R Slawski
(74) *Attorney, Agent, or Firm* — Kenton L. Freudenberg

(57) ABSTRACT

A device and method for expediting the repair of laminated automobile glass, comprising a supporting bridge removably mountable to a windshield surface over a damaged area, with a receptacle for receiving an injector or dispenser for UV curable repair resin, and guide means between said bridge and dispenser comprised of a guide pin and a guide groove with linear and helical portions. The resin dispenser can be quickly aligned, inserted into place and sealed against the windshield with only a partial twist. The dispenser includes a manually operable plunger which partially defines an expandable chamber to hold UV curable repair resin and provide a means of controllably applying vacuum or pressure to the resin and damaged cavity, valve means to allow selectable control of air to be released from or allowed into said chamber to facilitate creation and application of vacuum or pressure, further including means to lock the plunger in multiple selectable positions to maintain applied vacuum or pressure. Integrated ultra high intensity UV LED's surround the damaged area and apply sufficient intensity UV to fully cure the repair and surfacing resin without the use of any barrier film.

10 Claims, 13 Drawing Sheets

(51) Int. Cl.
*B29C 35/08* (2006.01)
*B29L 31/30* (2006.01)
*B29L 7/00* (2006.01)

(52) U.S. Cl.
CPC . *B29C 2035/0827* (2013.01); *B29L 2007/002* (2013.01); *B29L 2031/3052* (2013.01)

(58) Field of Classification Search
CPC .......... B29C 35/002; B29C 2035/0827; B29L 2007/002; B29L 2031/3052; B29L 2031/778; B29L 2031/7782; B32B 17/10963
USPC .......... 156/60, 94, 272.2, 275.5, 275.7, 285, 156/286, 349, 379.6, 423, 578; 264/36.21; 425/12, 13, 174, 174.4; 118/200, 256; 222/173, 180, 181.1, 181.2
See application file for complete search history.

(56) References Cited

U.S. PATENT DOCUMENTS

| | | | | |
|---|---|---|---|---|
| 5,670,180 A | * | 9/1997 | Mackey | ................ B29C 73/025 425/13 |
| 2005/0028917 A1 | * | 2/2005 | Rawlins | ................ B29C 73/025 264/102 |
| 2005/0238743 A1 | * | 10/2005 | Wanstrath | ............. B29C 73/025 425/12 |

* cited by examiner

DEVICE AND METHOD FOR THE REPAIR OF LAMINATED AUTOGLASS

RELATED APPLICATIONS

This application is related to and claims the benefit of and priority to U.S. Provisional Application No. 62/790,116 filed Jan. 9, 2019 and entitled "Windshield Repair Device for the Repair of Laminated Autoglass" and U.S. Provisional Application No. 62/792,275, filed Jan. 14, 2019, entitled "Windshield Repair Adhesive/Resin Curing Method" the entire disclosures of which are both hereby incorporated herein by reference in their entireties.

TECHNICAL FIELD

The present invention pertains to improvements in methods and tools for the repair of automotive windshield glass breaks and cracks.

BACKGROUND OF THE INVENTION

The present invention is directed to improved repair of damaged laminated automotive glass, such as a windshield, in a fast and economically viable manner. Millions of automotive windshields are cracked every year from small stones impacting the windshield at speed, commonly leaving impact damage which is roughly coin-sized, round or star-shaped with numerous small cracks radiating from the point of impact. Such damage is often referred to as a "bullseye" or "star-break."

Windshield repair in lieu of replacement has been known for more than 40 years, however new technology and methods have made great improvements in quality of repair and time spend to perform repairs. It has become common to repair such damage by injecting a curable clear liquid repair resin to completely fill the cracks of the damaged area and placing a layer of "finishing" or "surfacing" resin, sometimes referred to as "pit filler," over the injected resin to provide a smooth and level repaired surface matching that of the surrounding undamaged glass. Curing the resins in place creates an area which is optically and structurally similar to undamaged glass, thus avoiding the need to replace the entire windshield.

The injected repair resin is usually of very low viscosity to facilitate complete penetration into the fine cracks and crevices of the damaged glass, while the surfacing resin is typically of high viscosity to prevent it "running" or flowing away from the repair area while filling and leveling the damaged area and replacing any missing glass fragments.

UV curable acrylic resins, which harden as the result of a photochemical process upon exposure to ultraviolet light, have become the de facto standard for such repairs. Such UV curable resins provide the advantage of control of the curing time, both to avoid premature curing during placement of the resin and to allow immediate initiation of curing once the resin is placed. This can ensure greater efficiency and profitability for a repair technician and minimize any delay in returning the vehicle to use.

However, despite having the benefit of controllability, the commonly used UV curable resins typically have the disadvantage of being "air-inhibited" or "moisture inhibited," which causes the surface layer of a liquid resin exposed to air or atmospheric moisture to remain partially uncured. Because of such characteristics, it has become a common and mandatory practice to place a tab or strip of a Mylar (polyester) to cover the surfacing resin and serve as a barrier to prevent its exposure to air or moisture to ensure complete and final curing.

U.S. Pat. No. 3,562,366 to Sohl discloses an early example of a method of injecting clear resin for in-situ windshield repair describing a curing time of hours for the resin.

U.S. Pat. No. 3,765,975 to Hollingsworth describes a method involving the application of vacuum or pressure to a repair area by manual operation of a syringe plunger without providing any means for locking the device to retain either pressure or vacuum.

U.S. Pat. No. 3,993,520 to Werner, disclosing a device for repairing glass, describes manually adjustable screw actuators to select the application of alternating vacuum and pressure cycles to accomplish the removal of entrained air from the broken area.

U.S. Pat. No. 8,268,104 to Campfield describes methods to overcome the air or moisture inhibited characteristics of acrylic repair resins by incorporation of cationic epoxy resins.

Applicants' prior U.S. Pat. No. 8,378,315 to Wanstrath et al discloses a resin injector support bridge incorporating a source of UV radiation.

In performing repair of a windshield or similar glass structure it is desirable to have a device which can be set up and operated simply, quickly and accurately. The present invention provides several novel improvements over the devices and methods previously used by providing a device and method to simplify, control and expedite the repair process. The device providing a resin injector assembly which is compact, mechanically simple and durable. The device expedites the steps of device setup, application of multiple vacuum and pressure cycles to ensure completely filling a damaged cavity with repair resin, controlling the duration of such cycles, and further controlling the final curing of the repair resin. The device incorporates an integrated high intensity UV source which provides the novel benefit of allowing cure of air inhibited UV curable repair resin without the need for an air or moisture barrier film or other material.

SUMMARY OF THE INVENTION

The present invention provides an integrated structure which includes a bridge which is mounted on the windshield to quickly position and securely support a syringe-like resin injector and provide an array of high intensity LED's surrounding the damaged area to provide UV light to cure a repair resin. The injector provides a simple unitary mechanical means of (1) drawing a vacuum to evacuate air from the damaged area and (2) injecting and pressurizing liquid resin to facilitate completely filling the damaged area. The bridge and injector assembly incorporates a novel interface with linear and helical guide elements to allow the injector to be quickly aligned, positioned and then precisely sealed and secured against the windshield by simply inserting the injector into place in a supporting bridge with a simple one-dimensional movement toward the windshield, and a using a partial twist to seal and lock the injector in place. This provides expedited placement of the injector, in contrast to prior art fully threaded interfaces which use a comparatively slower and more tedious continuous "threading" movement and requiring multiple rotations of the injector to accomplish the entire axial positioning and sealing for use. The device of the present invention provides a mechanically simple method of providing infinite adjustment of the contact pressure at the sealing interface between the injector and windshield, particularly in contrast to prior art devices which seal using a relatively more complex stepped ratcheting system which is only incrementally adjustable.

Once the injector is in place and sealed over the damaged cavity, it is operated as a simple manually operated piston or plunger having a chamber which holds and dispenses repair resin. The injector is capable of providing either vacuum or pressure by increasing or decreasing the portion of the chamber volume not occupied by resin, depending upon which direction the plunger is moved. The injector incorporates a simple push button valve providing control of air allowed to enter or exit the main chamber as may be necessary to accurately create alternating cycles of vacuum and pressure while using the same portion of the available stroke length of the plunger, but in opposite directions. The elimination of voids or bubbles and placement of resin may require retention of vacuum or pressure involve the slow flow of resin into tiny cavities of a damaged area or, similarly, the flow of voids in the form of bubbles as they are removed from such cavities and the resin itself. Accordingly, the plunger is lockable in positions at each end of a stroke to hold such vacuum or pressure for any desired duration to ensure that the cavity of the damaged area is completely evacuated of air or voids and completely filled with void-free liquid resin.

The support bridge further includes an integrated power source for a UV light source comprised of a group of high intensity LED's surrounding and directed toward the damaged area, eliminating the need for a separate and/or external source of UV radiation to cure (harden) a UV activated repair resin commonly used in the automotive glass repair industry.

The integral UV LED's are of sufficient intensity to provide greatly expedited curing, reducing the cure time from minutes to seconds. Such high intensity also provides the novel and heretofore unknown benefit of being able to effect the cure of air or moisture inhibited resins without needing to provide a barrier, such as Mylar film or tabs as has been previously been necessary to isolate the resin, especially surfacing resin, from exposure to air or moisture.

It is an object of the present invention to provide a improved resin injection assembly for automotive glass repair which simplifies and accelerates the repair process.

It is an object of the present invention to provide an improved resin injection assembly for automotive glass repair with which is mechanically simple, durable and quick to set up for use.

It is an object of the present invention to provide an improved resin injection assembly with simple and quick alignment of a resin injector to a supporting bridge.

It is an object of the present invention to provide an improved resin injection assembly which provides for simple, quick and accurate sealing of a resin injector to a glass surface to be repaired.

It is an object of the present invention to provide an improved resin injection assembly which provides a resin injector with a means for simply and quickly releasing any air in an injector plunger chamber.

It is an object of the present invention to provide an improved resin injection assembly which avoids the need for an external source of pressure or vacuum.

It is an object of the present invention to provide an improved resin injection assembly which provides a resin injector capable of providing multiple alternating pressure and vacuum cycles in a simple manner to facilitate completely filling a damaged area of glass with repair resin.

It is an object of the present invention to provide an improved resin injection assembly for automotive glass repair which includes an integrated source of UV radiation for curing a repair resin.

It is an object of the present invention to provide an improved resin injection assembly which avoids the need for any external source of UV radiation to cure a liquid glass repair resin.

It is an object of the present invention to provide a source of high intensity UV radiation to greatly accelerate the curing time of a liquid glass repair resin.

It is an object of the present invention to provide a method of curing of a UV curable air or moisture inhibited repair resin without need for an inhibitor blocking film as has been heretofore used.

It is an object of the present invention to provide a single device including an improved resin injection assembly and an integrated source of high intensity UV radiation to allow greatly accelerated cure of a liquid repair resin.

It is an object of the invention to provide a resin injector for windshield repair capable of quickly applying vacuum or pressure, and being lockable to maintain either state.

It is an object of the invention to provide a device and method for windshield repair which is simple and self contained, requiring no external sources of pressure, vacuum, power or UV radiation to expedite curing of repair resin.

DETAILED DESCRIPTION OF THE INVENTION

The term "windshield" is used herein to broadly refer to any automotive glass, laminated glass or any glass or similar surface which may which may lend itself to repair using methods described or known in the prior art or identified herein.

Figure 3:
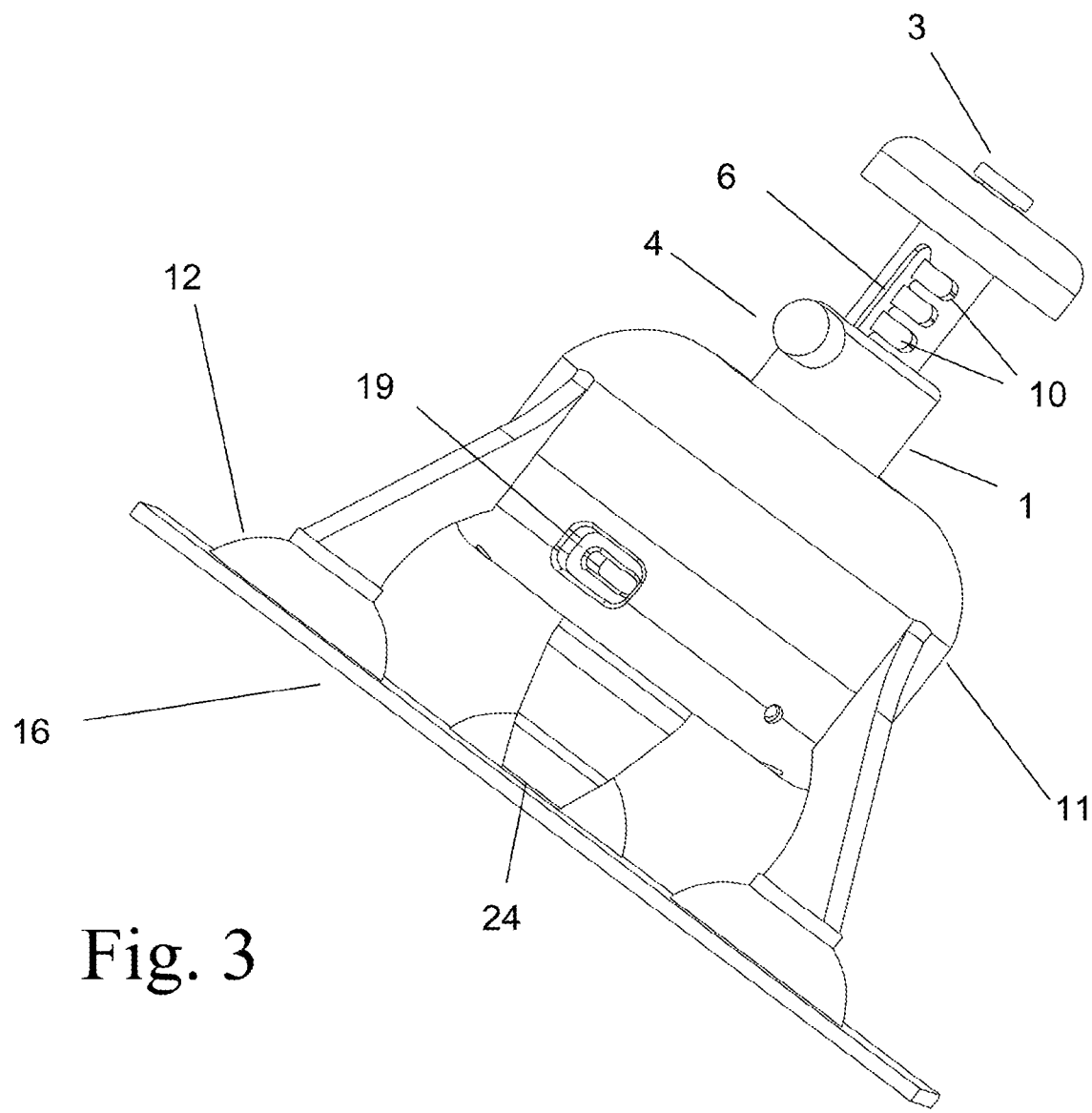
FIG. 3 is a side view of the full device assembly as it would be typically positioned for repair of a windshield.

As shown in FIG. 3, the device of the present invention is a self contained assembly made up a supporting bridge and curing module 11 which is secured to a damaged windshield to provide a means of mounting and supporting an injector assembly 1 used to fill a damaged area with repair resin by operation of a plunger 2. High intensity UV LED's 13, as described further below, are positioned on the lower surface of bridge 11 to provide UV radiation to cure repair resin.

In the preferred embodiment, bridge 11, injector body 1 and plunger 2, are constructed of stainless steel machined using well recognized CNC equipment and machining techniques. Alternative materials including steel, aluminum or various plastics or composite materials are also suitable. Bridge 11, injector land plunger 2 are precision machined to fit together so each can perform their function as described herein. Push button release valve 3 is preferably made of stainless steel with an internal rubber, viton or similar elastomeric material used to create an airtight seal.

Figure 4:
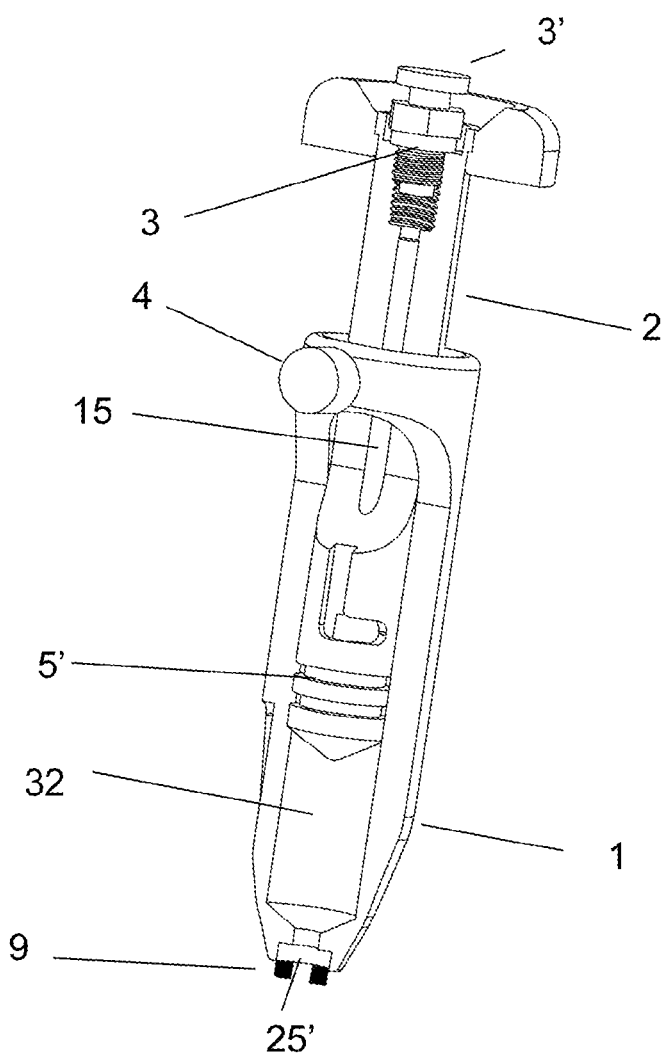
FIG. 4 is a partial cutaway view of the side view of the injector body, plunger and release valve.
Figure 5:
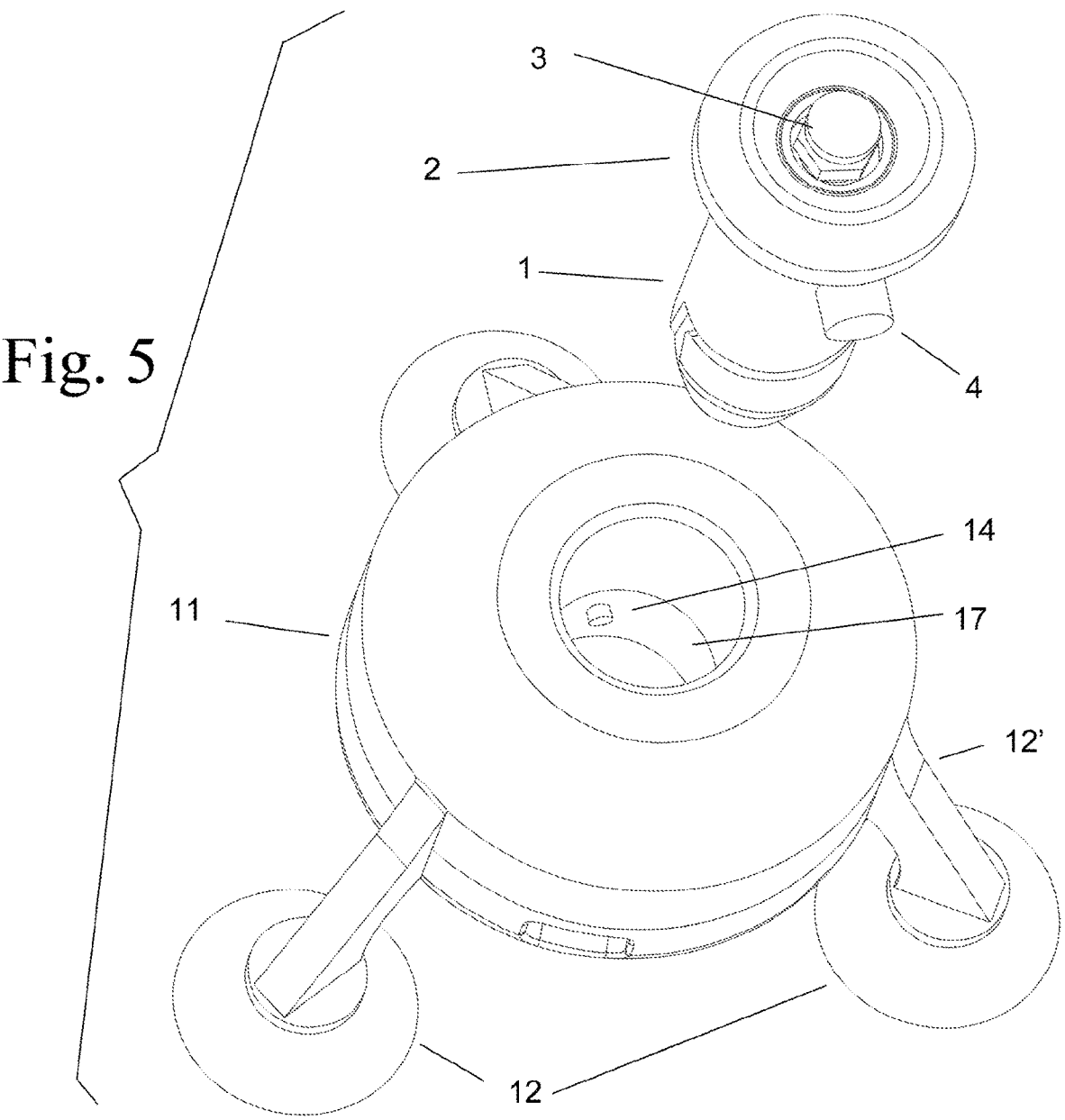
FIG. 5 is a view from above showing the injector body in relation to the support bridge.
Figure 6:
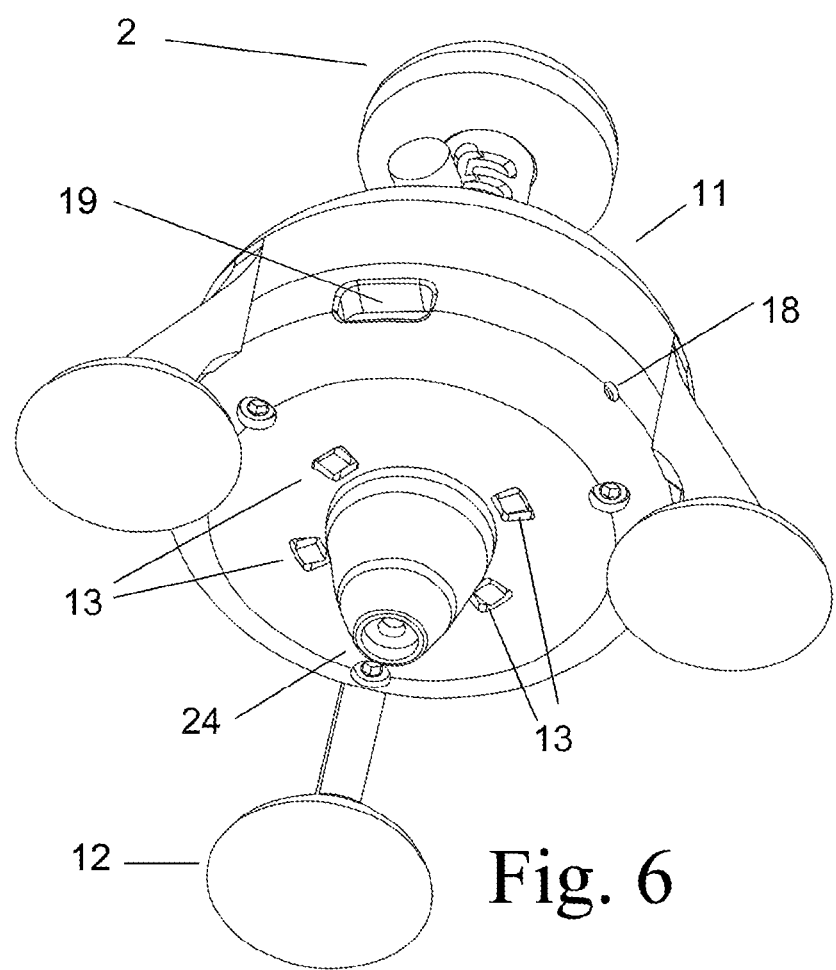
FIG. 6 is a view from below the support bridge showing the injector body positioned in the bridge for use and the high intensity UV LED's surrounding the resin injector on the lower surface of the bridge.
Figure 7:
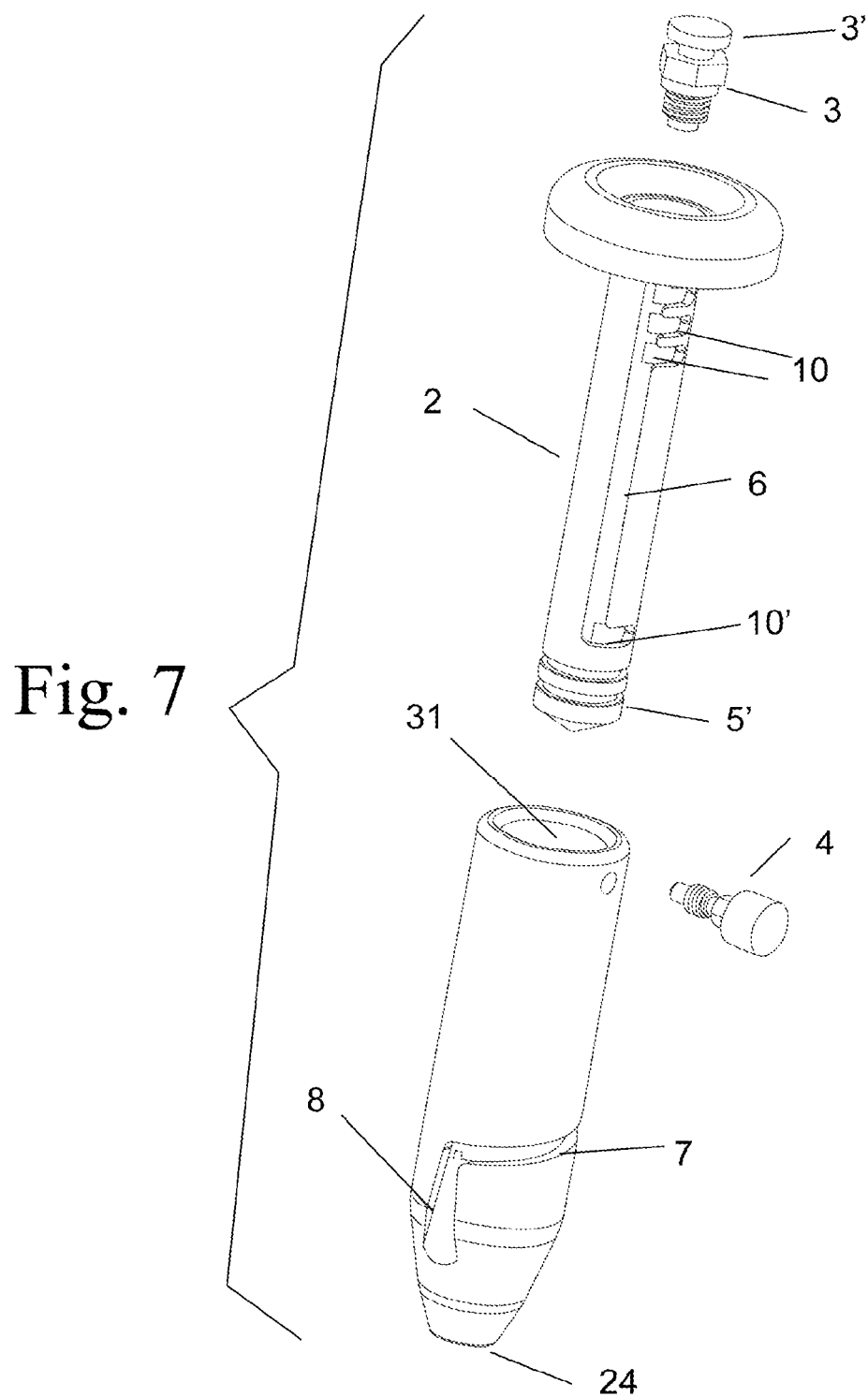
FIG. 7 is an exploded view corresponding to FIG. 2.
Figure 8:
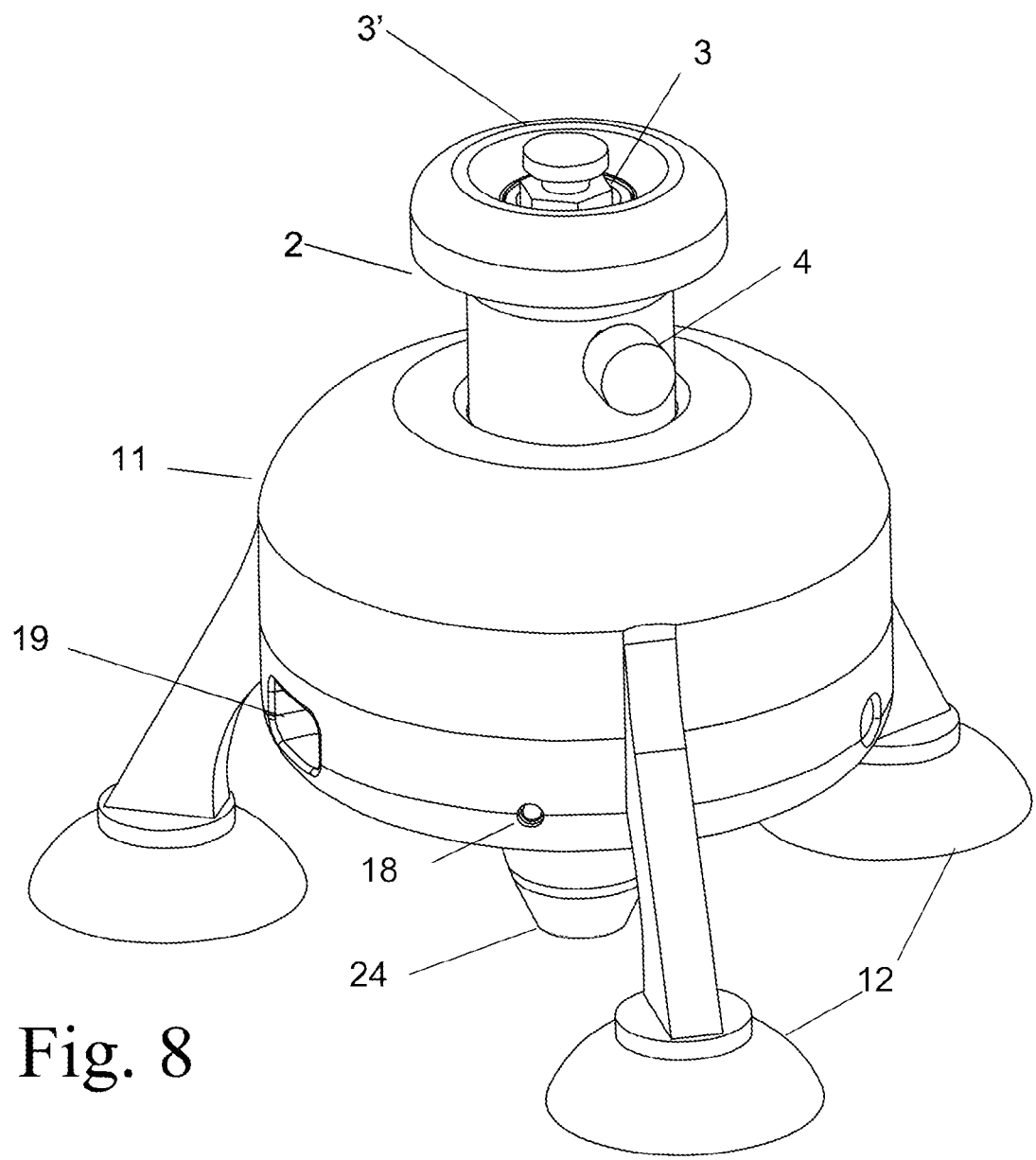
FIG. 8 is another perspective view of the full device assembly corresponding to FIG. 1.

Bridge 11 provides a central cylindrical bore 17 which serves as a receptacle for a resin injector assembly 1 to be used for repairing a damaged area. Referring to FIGS. 3 and 5, the bridge uses a tripod mounting configuration of three supporting legs 12", each with suction cup 12 or other suitable attachment means for mounting the bridge to the windshield to provide a stable and secure base above and surrounding the damaged area 21. Following any appropriate preparation of the damaged area, bridge 11 is placed on the windshield centered and directly over the area to be repaired and secured to windshield 16 with the suction cups 12, as shown in FIG. 4.

In most cases, an injector is used as hereafter described to evacuate air and introduce repair resin into the small cracks and crevices of the damaged area. In some cases, such as those involving only a simple surface pit or chip, it may be possible to accomplish the repair using only the final step described below of application and UV curing of a surfacing resin.

Figure 1:
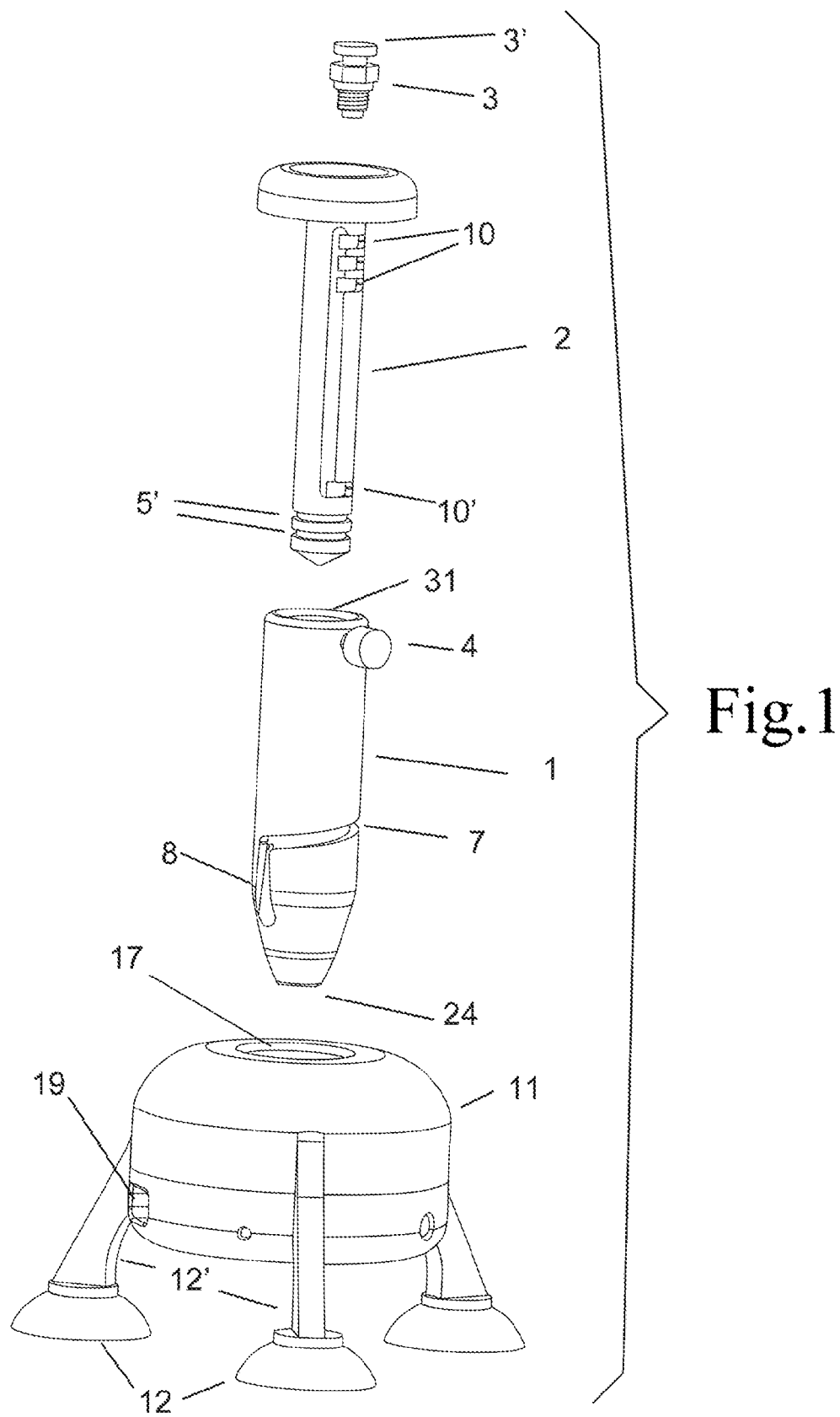
FIG. 1 is an exploded perspective view of the full device assembly comprising a support bridge, injector body, plunger and release valve.
Figure 2:
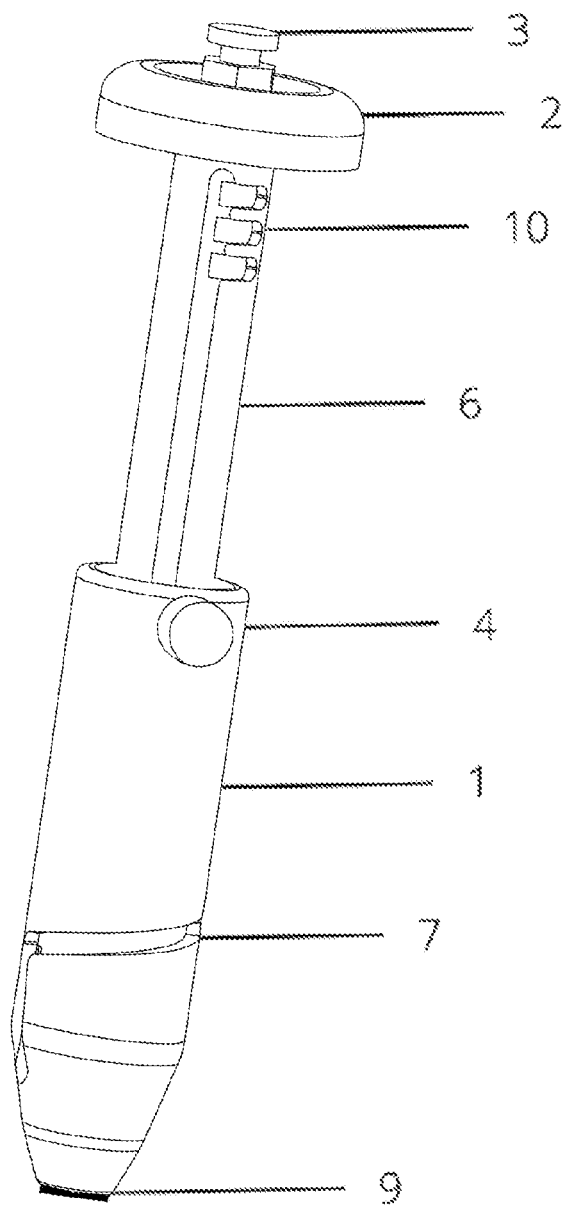
FIG. 2 is a perspective view of the injector body and plunger.
Figure 9:
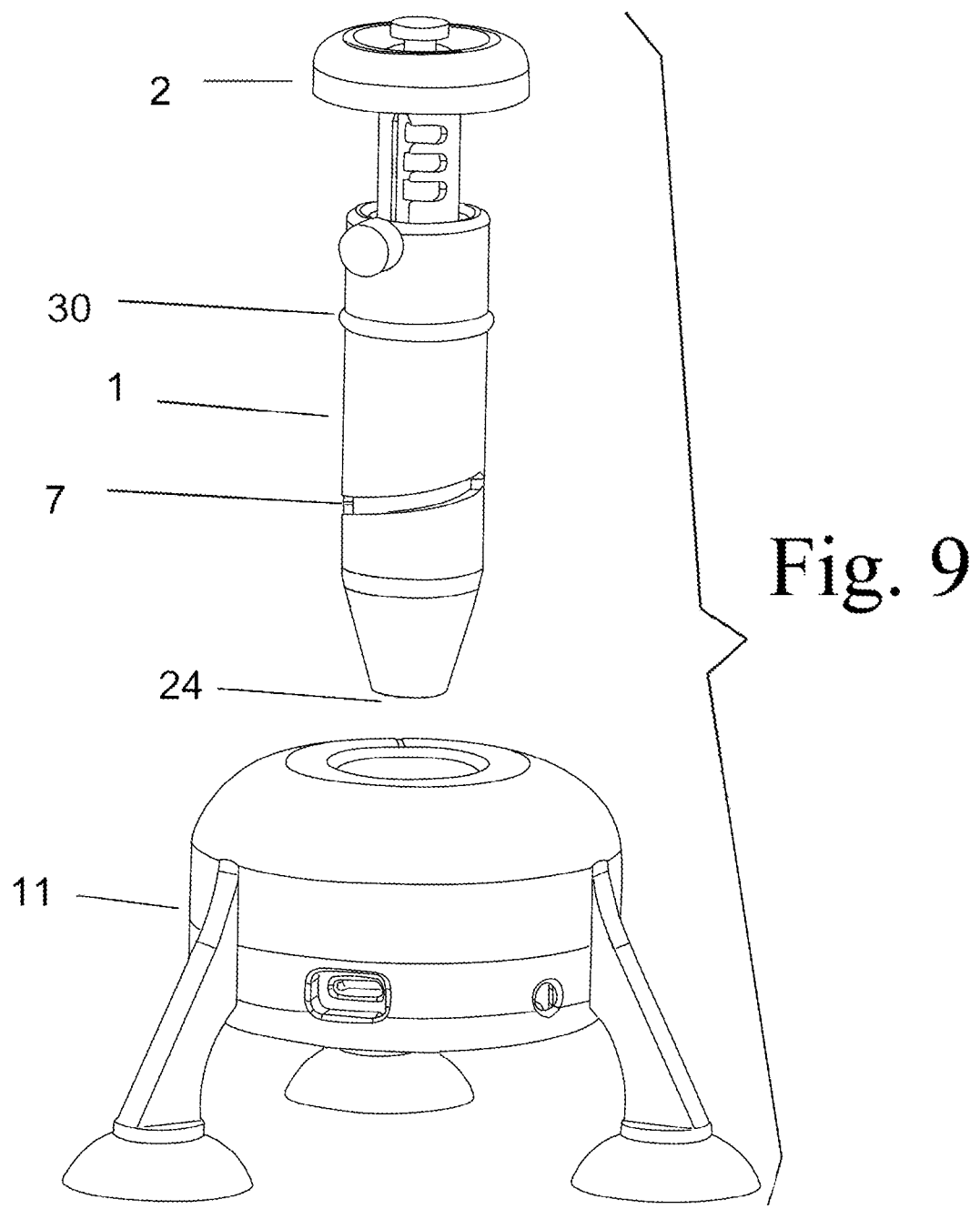
FIG. 9 is a partially exploded view of the support bridge, and injector body with a frictional O-ring in place

Referring to FIG. 1, the generally cylindrical exterior surface of injector body 1 is provided with a continuous groove or channel comprised of a generally helical portion 7 and generally linear and axial portion 8. Helical portion 7 extends over a portion of the circumference of the surface of injector body 1. As shown in FIG. 9, an annular friction ring 30 of elastomeric material, an "O-ring," is seated in a corresponding annular channel 29 in the exterior surface of body 1. With bridge 11 in place, injector 1 is inserted into the center receptacle 17 of bridge 11 and aligned with alignment groove 8 engaging with a guide pin 14 which protrudes from the inner surface of the receptacle bore 17 of bridge 11. Guided by pin 14 in groove 8, the injector 1 is moved in a direct linear or axial fashion orthogonally toward the windshield surface until guide pin 14 begins to engage helix groove portion 7 of the guide channel. At this point, injector seal 9 at the tip of injector body 1 is in close proximity to the windshield surface 16 and the portion of the injector body bearing friction ring 30 will begin to pass into receptacle 17 where ring 30 can provide frictional contact with inner bore of said receptacle. Final sealing contact of tip 24 with the windshield is achieved by a simple partial manual rotation of the injector body through an arc of less than 360 degrees so that the interaction between of the guide pin 14 and helix groove 7 causes the slight necessary axial movement of the injector body to bring the tip of the injector into sealing contact with windshield.

While the guide and locking structure as described uses pin on the supporting bridge to engage a guide channel on the injector assembly, it is to be understood that the respective locations of these engaging elements could be reversed without departing from the spirit of the present invention.

An injector tip seal ring 9 of rubber, Viton or similar elastomeric or similar material is fitted into the bottom tip 24 of injector body to surround the tip orifice 25' of passage 25 to form an airtight seal when the device is seated against a windshield 16 for use. The sealing force can be finely controlled and adjusted with only slight rotation of the injector body. Helix groove 7 is configured with an appropriate low angle of pitch such that the interface friction between guide pin 14 and helix groove 7 is sufficient to prevent rotation of injector body 1. Once frictional ring 30 is in contact with the inner bore of receptacle 17, such contact creates additional friction to further prevent any rotation of the injector body and lock the injector body against axial movement. The injector tip is thereby locked and held securely against the windshield 16, even during pressure cycles. This ensures that an airtight seal between injector tip 24 and windshield 16 is maintained once the device is positioned. Such seal creates a single continuous sealed cavity comprised of the cavity of the damaged area, air passage 25 and chamber 32 of the injector.

Retractable spring pin 4 is threaded into the exterior of the injector body 1 and protrudes into the hollow cylindrical center bore 31 where it can engage a continuous guide groove on plunger 2, which guides free axial movement of the plunger. Spring pin 4 is spring biased to a normal position where it extends slightly into central bore 30 of the injector body. It may be retracted against such bias so that the bore 30 of chamber 32 is unobstructed, allowing plunger 2 to be inserted or removed from the injector bore.

The exterior surface of Plunger 2 is provided with a continuous guide groove comprised of axial guide channel 6, and circumferential pressure locking channels 10 and vacuum locking channel 10' which are machined or otherwise formed in exterior of plunger 2. Locking channels 10 and 10' are generally perpendicular to guide channel 6.

Plunger 2 is fitted with two annular chamber seals 5 of suitable elastomer or similar material seated in annular seal grooves 5' and making full contact with the internal bore of injector 1 so as to allow retention of pressure or vacuum within chamber 32, air passage 15 and the cavity of the damaged glass which are continuous when the device is in use and sealed.

Push button release valve 3 is a simple manually operable push-button valve fitted into the end of plunger 2 to provide valve control of a central passage 15 in plunger 2 through which chamber 32 may communicate with the ambient atmosphere. Passage 15 extends axially through the entirety of plunger 2. Said valve is spring biased to a closed position with sufficient force to retain any vacuum or pressure which may be developed in said chamber. It is significant in the operation of the invention in that it allows for chamber 32 to be quickly exposed to ambient pressure at any point in the travel of plunger 2, so that any subsequent movement of the plunger which increases or decreases the volume of chamber also decreases or increases, respectively, the relative internal pressure of said chamber. Accordingly, the operator may quickly and selectably create pressure or vacuum as may be desired.

With the injector sealed against the windshield and plunger 2 removed, an appropriate amount of clear UV curable repair resin, typically a few drops, is placed into the central bore 31 of the injector body. Spring pin 4 is retracted so that the internal bore of the injector body is unobstructed and Plunger 2 is inserted to a point where seals 5 are in contact with the continuous cylindrical walls of the central bore and spring pin 4 can be released to engage the plunger guide channels. With the chamber 32 sealed, the push button 3' of air release valve 3 is depressed and held to allow air to escape as plunger 2 is pressed to the bottom of the injector bore. At this point little to no air remains above the resin within the confined chamber 32 of the injector. Valve 3 is allowed to close and seal by releasing button 3'.

At this point a "vacuum" cycle is initiated. Plunger 2 is manually pulled upward and away from the windshield to expand the sealed chamber 32 and create a strong vacuum (i.e. greatly reduced pressure) within said chamber. At the end of the upward plunger stroke, the plunger 2 is rotated with a partial turn so that spring pin 4 engages grooved vacuum notch 10. The plunger is thereby locked against axial movement. The plunger is left in such position for a chosen duration such as 1 to 2 minutes, maintaining the established vacuum within chamber 32, passage 25 and the cavity of the damaged glass to facilitate pulling the air out of the smallest cracks in the damaged portion of windshield 16 glass.

After the chosen duration of vacuum, a "pressure" cycle is initiated. Button 3' is momentarily pressed to open release valve 3, allowing ambient air to re-enter the chamber 32 and restore ambient atmospheric pressure. Button 3' is then released to close valve 3 and reseal the chamber 32. Plunger 2 is then manually pressed downward toward the windshield 16, thereby decreasing the volume of sealed chamber 32, compressing the confined air and increasing the pressure within the chamber, thereby applying such pressure to the repair resin to facilitate and force its flow through passage 15 into the evacuated crevices of the damaged glass. At a chosen point in the movement the plunger 2 is rotated with a partial turn so that spring pin 4 can engage one of the selected grooved pressure lock notch 10. The plunger is thereby locked against axial movement. The plunger is left in such position for a chosen duration, such as 3 to 5 minutes, during which the repair resin remains under pressure, causing it to continue to creep and flow to fill voids in the damaged glass.

The sequence of vacuum and pressure cycles may be repeated multiple times to ensure that the repaired area is free of voids and completely filled. In some cases, it will be desirable to maintain pressure on the injected repair resin as it cured. In such cases the integrated high intensity UV source is activated as described below as a first step to cure the injected repair resin before releasing the injector 1 from contact with the windshield and applying the surfacing resin.

In a final step, surfacing resin is applied and the resin is cured by exposure the high intensity UV radiation provided by high intensity LED's. Following the injection of repair resin, the injector 1 is released from bridge 1 using a partial turn to disengage helical guide 7 and is lifted straight out of its position in repair bridge 1, which remains in place. Alternatively, for some repairs such as filling a shallow chip, bridge 1 is attached as described and centered over the damage 21, but the sequence of injecting resin using the injector assembly 1 may be bypassed. In such case the repair may be completed using only the final step of applying and curing the surfacing resin as hereafter described.

The surfacing resin is also a UV curable adhesive acrylic resin, generally of a viscosity high enough to limit flow when applied to a surface or open pit. Typically, 1 or 2 drops, or up to about 1 (one) cc of resin is applied to the surface of the windshield 16 directly on the chip/crack damage 21 using an applicator bottle 23 or other suitable dispenser. After placement of the surfacing resin, and in contrast to the established prior art methods, no barrier film or material is placed over the surfacing resin, thus eliminating a step previously used and simplifying the repair process.

Figure 10:
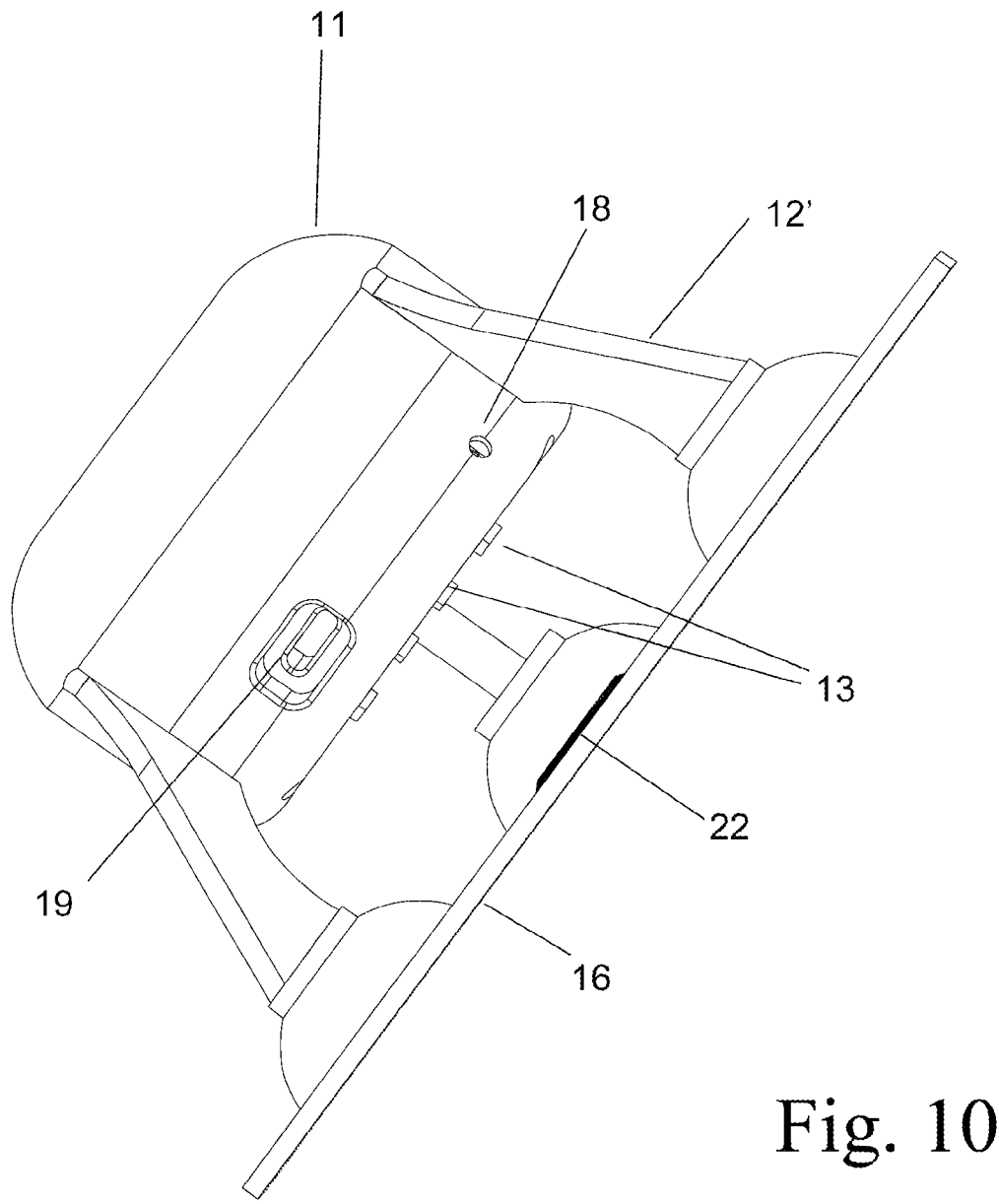
FIG. 10 is a side view of the windshield repair bridge on a windshield.
Figure 11:
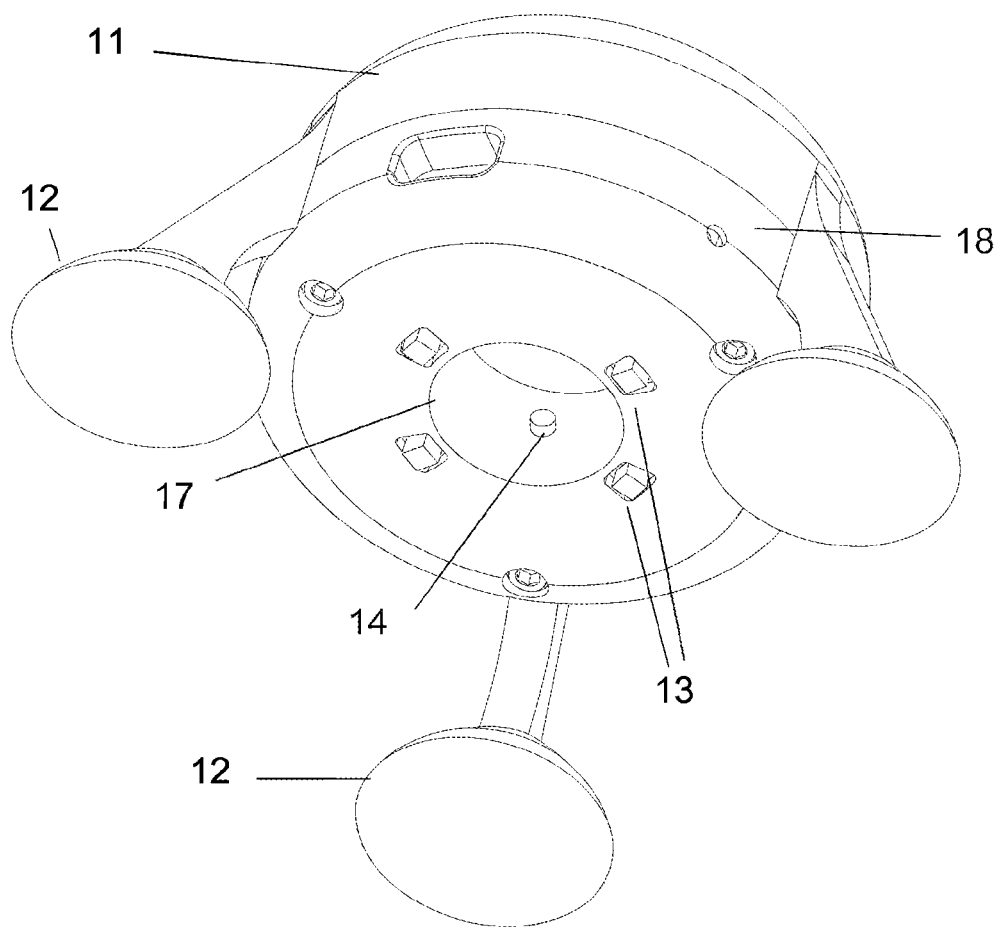
FIG. 11 is a view from below the support bridge showing the power port and arrangement of UV LED's.
Figure 12:
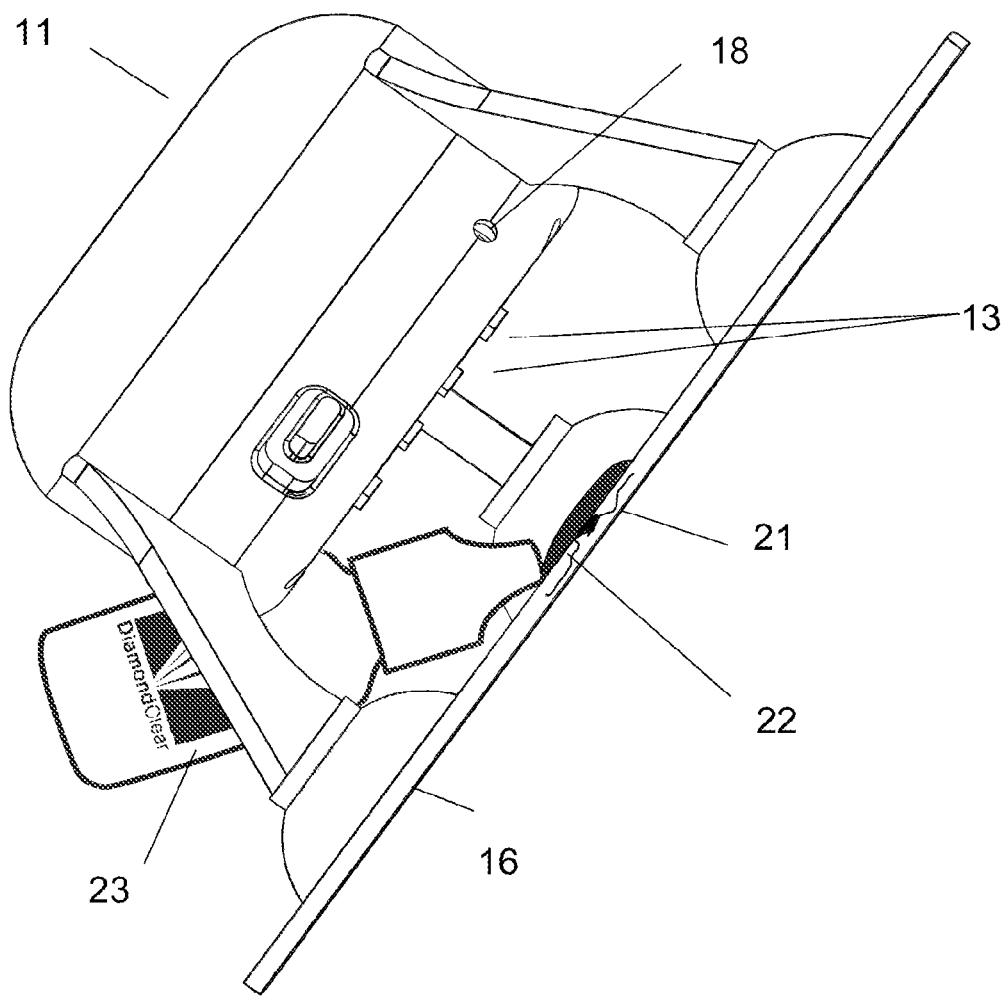
FIG. 12 is a side view of the supporting bridge on a windshield and components related to high intensity UV curing.
Figure 13:
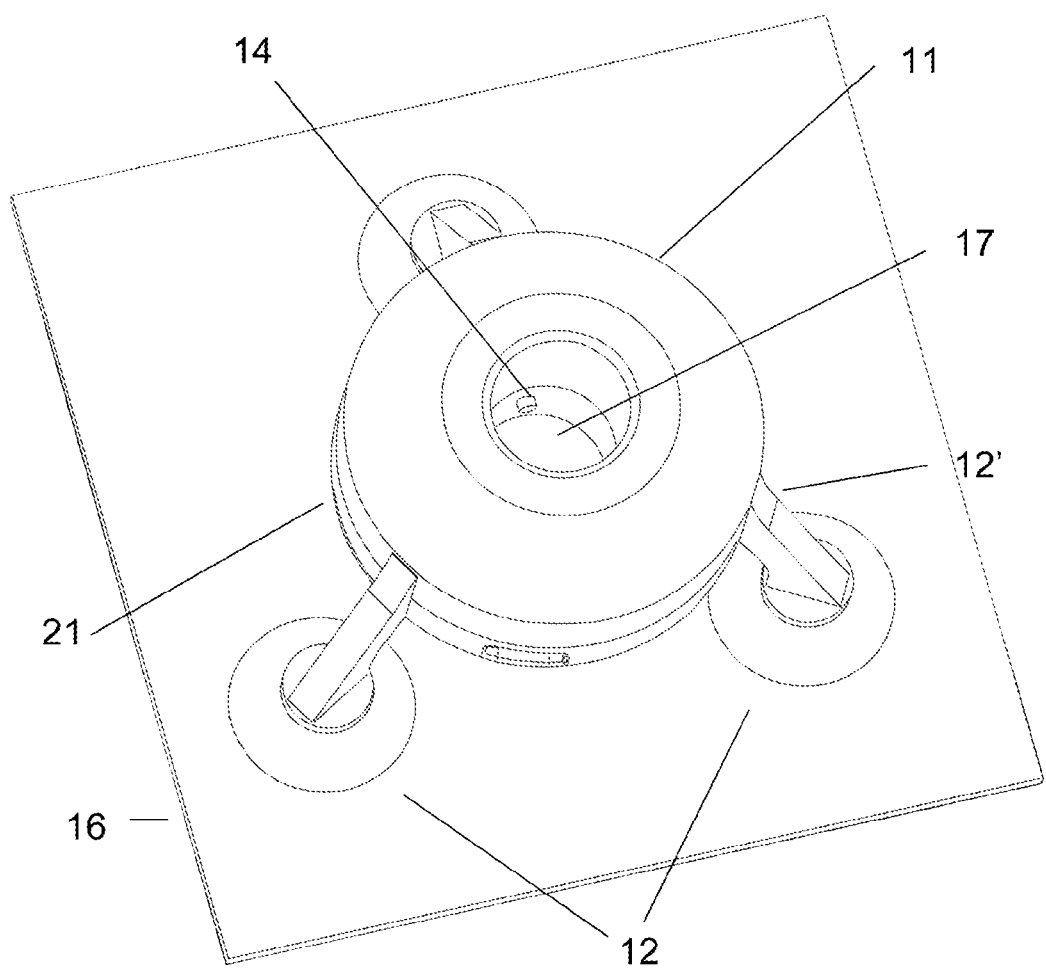
FIG. 13 is an overhead perspective view of the supporting bridge as it would be positioned over a damaged area for initial setup or final high intensity UV curing of the repair resin.

As can be seen most clearly in FIGS. 10 and 11, the lower surface of supporting bridge 11 is fitted with an array of 4 high intensity UV LEDs 13 or UV LED substrate modules, or any such similar configuration or array of UV LEDs or UV LED substrate modules that sufficiently cover the repair area with UV light of sufficient intensity. Such LED's surround the center receptacle and are directed downwardly and arranged to be able to direct UV light to completely cover a resin-filled repair area. To support the specific radiant flux of the preferred embodiment described herein, the lower surface of the supporting bridge 11 is positioned no more than about 1.5 (4 cm) inches away from the windshield 16.

Push button switch 8 activates the high intensity LED's, which are powered on for a period of 15-20 seconds, to expose the UV sensitive surfacing and/or repair resin to high intensity UV radiation to effect a complete cure of such resin, including any air-exposed surface. Increased UV intensity provides the expected benefit of decreasing the curing time of the resin. However it has been found that a sufficiently high intensity of UV radiation, as set forth herein, also provides the unexpected result of overcoming the air-inhibited curing characteristic of the resin which has heretofore required that such resin be isolated from exposure to air (or moisture) while curing to ensure a complete cure.

Incorporated into a compartment (not shown) within the bridge body are the necessary circuitry and power source to drive the LED's. Such circuitry may include a timer to automatically control the duration of LED activation. In the preferred embodiment, power is provided by a rechargeable 7.4 to 20 volt lithium ion battery having a capacity of 800 milliamp-hours. While the internal lithium batteries can be recharged using the external power port 19, the device could be powered using any suitable external powered source connected through port 19.

The UV LED's 3 are chosen to produce a peak wavelength of 360 nanometer to 375 nanometer and a total radiant flux of no less than 800 MW up to about 5000 MW. This has been found to activate and fully cure the adhesive/UV resin 22 on the surface and within the chip/long crack 21 repair in 15 to 20 seconds without the need to apply a Mylar curing film tab 20 over the windshield chip repair area. Alternatively, any UV source which is of sufficient intensity to effect a cure of the repair resin in less than about 20 seconds may be used in lieu of the specific embodiment described herein.

Other variations within the scope of this invention will be apparent from the described embodiment and it is intended that the present descriptions be illustrative of the inventive features encompassed by the appended claims.

What is claimed is:

1. A device for repair of a damaged windshield, comprising a support and curing bridge removably mountable to the surface of said damaged windshield over a repair area, said bridge having a receptacle for removably receiving and holding a resin injector, said device further comprising a resin injector body having an injector tip to seal against said windshield surface, continuous guide and locking means for guiding movement of said injector relative to said bridge and into contact with said windshield surface, said guide and locking means including a first guiding portion providing a linear path, said guide and locking means including a second guiding and locking portion incorporating a partial helical path, wherein said helical path is engaged by rotation of said resin injector body.

2. A device according to claim 1 wherein said guide and locking means comprises a pin engaged with a channel.

3. A device according to claim 2 wherein said pin is located on said bridge and said channel is located on said resin injector body.

4. A device according to claim 1 wherein said first linear guiding portion guides said resin injector body in a linear fashion so that said injector tip is in sufficiently close proximity to said windshield surface such that a final axial movement of said resin injector body to seal said injector tip against said windshield surface is provided by engagement and movement of said second guiding and locking portion through its helical path.

5. A device according to claim 4 wherein said helical path requires less than a full rotation of the resin injector body to seal said injector tip against said windshield surface.

6. A resin injector assembly for repair of a damaged windshield comprising an injector body, a sealable expandable chamber within said injector body for receiving a quantity of repair resin, said chamber including a passage means for communicating with the windshield surface over a damaged area, said injector body having a tip to seal against the surface of said windshield, a plunger axially movable within said injector body to partially define said chamber and selectably control the volume of said chamber, movement of said plunger being guided by continuous engageable guide means including a first linear guide portion permitting free axial movement of said plunger, and one or more second annular guide portions, each said annular portion being perpendicular to said linear guide portion, each said annular portion allowing partial rotational movement of said plunger and providing a locking means wherein said plunger is locked against axial moment when any said annular portion is engaged, said continuous engageable guide means and said locking means further comprising a pin on said injector body engaged with a channel on said plunger wherein said pin is retractable to allow the plunger to be inserted or removed from said injector body.

7. A resin injector according to claim 6 wherein said pin may be selectively engaged with one of said annular portions by rotation of said plunger to lock said plunger against axial movement.

8. A resin injector assembly for repair of a damaged windshield comprising an injector body, a sealable expandable chamber within said injector body for receiving a quantity of repair resin, said chamber including a passage means for communicating with the windshield surface over a damaged area, said injector body having a tip to seal against the surface of said windshield, a plunger axially movable within said injector body to partially define said chamber and selectably control the volume of said chamber, movement of said plunger being guided by continuous engageable guide means including a first linear guide portion permitting free axial movement of said plunger, and one or more second annular guide portions, each said annular portion being perpendicular to said linear guide portion, each said annular portion allowing partial rotational movement of said plunger and providing a locking means wherein said plunger is locked against axial moment when any said annular portion is engaged, further including a manually operable valve to selectably control communication between said chamber and the ambient atmosphere, said valve being operable independent of the position of the plunger within said chamber.

9. A resin injector according to claim 8 including at least one of said second annular guide portions configured to axially lock said plunger with said chamber sealed in a high volume configuration to hold vacuum and including at least one of said second annular guide portions configured to axially lock said plunger with said chamber sealed in a low volume configuration to hold pressure.

10. A resin injector according to claim 8 wherein said one or more annular guide portions are engaged by a partial rotation of said plunger about its axis.

* * * * *